VELOCITY WELL LOGGING

Original Filed Oct. 28, 1950 4 Sheets-Sheet 1

GERALD C. SUMMERS
INVENTOR.

BY D. Earl Richards
AGENT

GERALD C. SUMMERS
INVENTOR.

BY D. Earl Richards
AGENT

VELOCITY WELL LOGGING

Original Filed Oct. 28, 1950 4 Sheets-Sheet 3

GERALD C. SUMMERS
INVENTOR.

BY O. Earl Richards
AGENT

VELOCITY WELL LOGGING

Original Filed Oct. 28, 1950 4 Sheets-Sheet 4

GERALD C. SUMMERS
INVENTOR.

BY D. Earl Richards
AGENT

United States Patent Office

Re. 24,446
Reissued Mar. 25, 1958

24,446

VELOCITY WELL LOGGING

Gerald C. Summers, Dallas, Tex., assignor, by mesne assignments, to Socony Mobil Oil Company, Inc., New York, N. Y., a corporation of New York Original No. 2,704,364, dated March 15, 1955, Serial No. 192,750, October 28, 1950. Application for reissue March 11, 1957, Serial No. 645,387

12 Claims. (Cl. 181—.5)

Matter enclosed in heavy brackets [ ] appears in the original patent but forms no part of this reissue specification; matter printed in italics indicates the additions made by reissue.

This invention relates to the measurement of the velocity of elastic impulses or waves through formations adjacent a well bore.

The study of the formations through which bore holes extend includes the procurement of samples of material removed during drilling operations and the analysis thereof plus the measurement of as many properties of the formations in situ as is possible in order accurately to locate mineral bearing sections along the length of the bore hole. Logs of self-potential, electrical resistivity, and radio activity are commercially available and extensively used in the petroleum industry.

The present invention is directed to the study of the acoustic properties of earth formations. Of particular interest in the search for petroleum are the porosity, permeability, and fluid content of subsurface formations. The acoustic properties are intimately associated with the foregoing characteristics of a given stratum and thus measurements that are related directly to and controlled principally by acoustic properties of a formation constitute invaluable information to geologists and geophysicists in their studies of subsurface lithology.

Prior art systems have suggested the measurement of the velocity of acoustic impulses traveling through selected or predetermined sections along the length of a bore hole. It is an object of the present invention to provide an improved system for measuring the time interval for transit of an acoustic impulse between selected spaced points.

It is a further object of the invention to produce a voltage that is controlled in magnitude by the velocity of an acoustic impulse through a selected section of formations adjacent a well bore.

Another object of the invention is to provide an accurate measurement of the time interval between repeatedly occurring primary pulses and secondary pulses, one of which occurs in each interval between the primary pulses.

In accordance with the present invention and in one form thereof there is provided a system for measuring the interval between the generation of an elastic impulse at a transmitter positioned in a well bore and the generation of a voltage pulse at a receiver supported in predeterminad spaced relation from the transmitter upon arrival at the receiver of the elastic impulse. A voltage that varies monotonically from a predetermined initial value following the generation of the elastic impulse is connected in circuit with a capacitive element and a normally open switch. Means interconnecting the receiver and the switch momentarily closes the switch in response to the voltage pulse generated by the receiver to charge the capacitive element to a voltage equal to the magnitude of the monotonically varying voltage at the instant of arrival of the elastic impulse at the receiver.

For a more complete understanding of the present invention and for further objects and advantages thereof, reference may now be had to the following description taken in conjunction with the accompanying drawings in which:

Fig. 1 diagrammatically represents an acoustic well logging system which embodies the present invention;

Fig. 2 includes a plurality of graphs showing the variations in circuit parameters and voltages as a function of time following an initial or primary pulse;

Figures 1, 2:
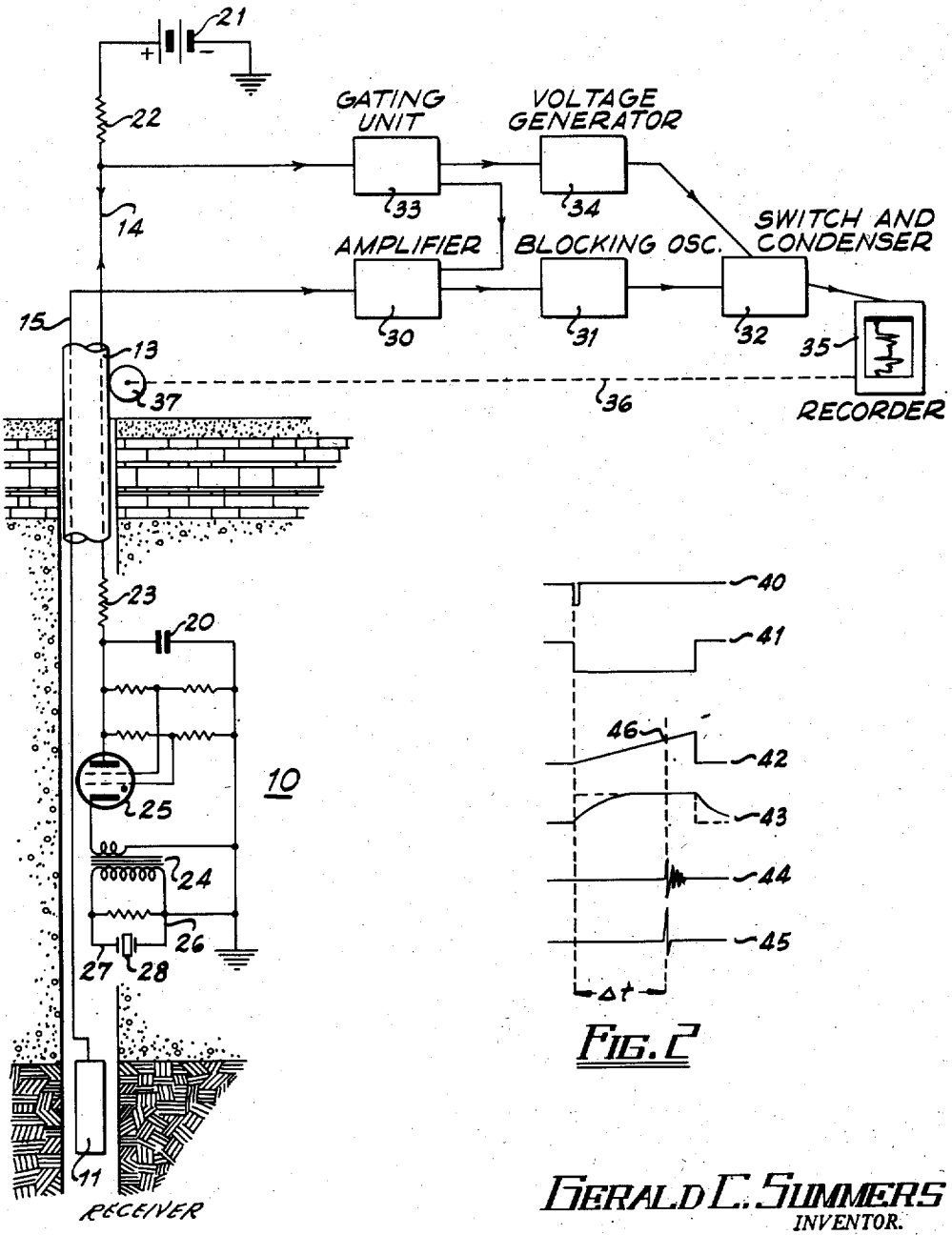

Referring now to Fig. 1, there is disclosed a well logging system wherein a transmitter 10 and a receiver 11 are positioned in a bore hole 12. The transmitter and receiver ordinarily are supported in a fixed, spaced relation and are suspended in the bore hole by a cable 13 that extends to surface measuring and recording equipment. In the form illustrated, the cable 13 includes conductors 14 and 15, and may, in addition, include a tension bearing member (not shown).

The transmitter 10 may include a relaxation oscillator in which a condenser 20 is charged from a source at the surface, generically represented by the battery 21, through a series resistor 22, conductor 14 and resistor 23. The oscillator circuit includes the primary winding of a transformer 24 connected in series with the condenser 20 and the anode-cathode impedance of a gas filled, cold cathode tetrode 25. In operation, the condenser 20 discharges periodically through the primary of the transformer 24 and through the tube 25 to produce a voltage pulse in the transformer 24, the pulse rate depending upon the time constants of circuits connected to the control and screen grids of tube 25 and to the condenser 20. The secondary winding of the transformer 24 is coupled by way of conductors 26 and 27 to a crystal 28. Variation in the voltage across the crystal 28 produces a change in physical dimensions thereof which imparts a sharp compressional pulse to the media adjacent thereto. While the supporting structure for crystal 28 may take different forms, as are well known in the art, the means illustrated in the application of Pat McDonald for Acoustic Well Logging System, Serial Number 181,284, filed August 24, 1950, has been found to be particularly advantageous.

Upon receipt at the receiver 11 of the elastic impulse generated by the crystal 28, a voltage pulse is produced which is transmitted by way of conductor 15 to surface recording equipment. The portion of the system located at the earth surface measures accurately the interval of time between a primary pulse coinciding with the generation of the elastic impulse at the transmitter 10 and generation of a secondary pulse coinciding with the arrival of the elastic impulse at the receiver 11.

More specifically, the surface system includes an amplifier 30 which is connected by way of converting unit 31 to a switch 32. As will be further explained in connection with Fig. 3, the switch 32 has associated therewith a capacitive element that is charged to a voltage proportional to the interval of time between the transmitted pulse and the receipt of that pulse by the receiver. This is accomplished by providing a gating unit 33 responsive to the electrical pulse generated [by] *when conduction is initiated in tube 25 of* the relaxation oscillator 10. The gating unit 33 is coupled directly to a voltage generator 34 to initiate the generation of a voltage which changes monotonically (i. e., without change in sign of the slope thereof) from an initial value following actuation of the gating unit 33. Upon receipt of the pulse by the amplifier 30, the unit 31, which may be a blocking oscillator, is utilized momentarily to close the switch 32 to charge the capacitive element therein to a voltage equal to the magnitude of the monotonically changing voltage at the instant of arrival of the pulse at the receiver 11. The voltage across the capacitive element is measured and is at all times inversely proportional to the velocity of the formation between transmitter 10 and [reeciver] *receiver* 11.

The foregoing measurement of the condenser voltage may be accomplished in several ways, but for the purpose of the present description a recorder 35 is shown generically to represent such measuring schemes. As is common practice in the well logging art, the recorder 35 may be driven by way of a coupling 36 actuated or controlled by a pulley 37 adjacent the cable 13 whereby movement of the associated recording chart will be directly proportional to movement of the transmitter and receiver in the bore hole.

The operation of Fig. 1 may better be understood by reference to Fig. 2. The various functions or wave patterns graphically illustrated in Fig. 2 are plotted on a time base extending along the x-axis with functions that will be hereinafter designated plotted along the y-axis. The curve 40 functionally represents the voltage across the crystal 28 as a function of time. The receipt of this voltage pulse by the gating unit 33 generates a negative voltage gate as illustrated by the curve 41. The length of the gate 41 determined by the construction of the circuit 33 is greater than the time interval required for the transmission of an elastic impulse between the transmitter 10 and the [reciver 11 is] *receiver 11 in* the lowest velocity formations to be measured. Further, the gate length is shorter than the period of the repitition rate of the pulse of curve 40 as generated by the periodic discharge of condenser 20. The negative gate of the curve 41 when applied to the voltage generator 34 initiates the production of *an electrical function, i. e.,* a voltage which varies monotonically following the instant of generation of the pulse 40. In the preferred form, the voltage has a saw-tooth wave form such as illustrated by curve 42 which is repeated in time under the control of the pulse 40. While other wave forms are suitable, the calibration of a linearly varying voltage is much more readily accomplished than the calibration of other monotonically changing voltages and is thus preferred.

A positive gate (not shown in Fig. 2) is applied from the gating unit 33 to the amplifier 30. Means later to be described are provided in the amplifier 30 for modifying the positive gate from the unit 33 so that the gain of the amplifier 30 varies in a manner illustrated by the curve 43. At a time after the transmission of the control pulse 40, determined by the curve 43, the gain of the initially unresponsive amplifier 30 is raised to the point that it will amplify signals such as the oscillatory voltage 44 generated by the receiver 11 in response to the arrival of the elastic impulse. The voltage 44, amplified by the amplifier 30, is applied to the unit 31 which produces voltage pulse or oscillation such as illustrated by the curve 45. The voltage from the unit 31 is then utilized to operate *a circuit control means, i. e.,* the switch 32, *having structure which upon actuation thereof interconnects the voltage generator 34 and the electrical storage means* to charge the capacitive element associated therewith to a voltage equal to the magnitude of the saw-tooth voltage 42 at the point 46. As the voltage 42 changes linearly with time, the magnitude of the voltage at point 46 is directly proportional to the time interval ($\Delta t$) between the generation of the pulse 40 and the arrival of the pulse 44.

Figure 3:
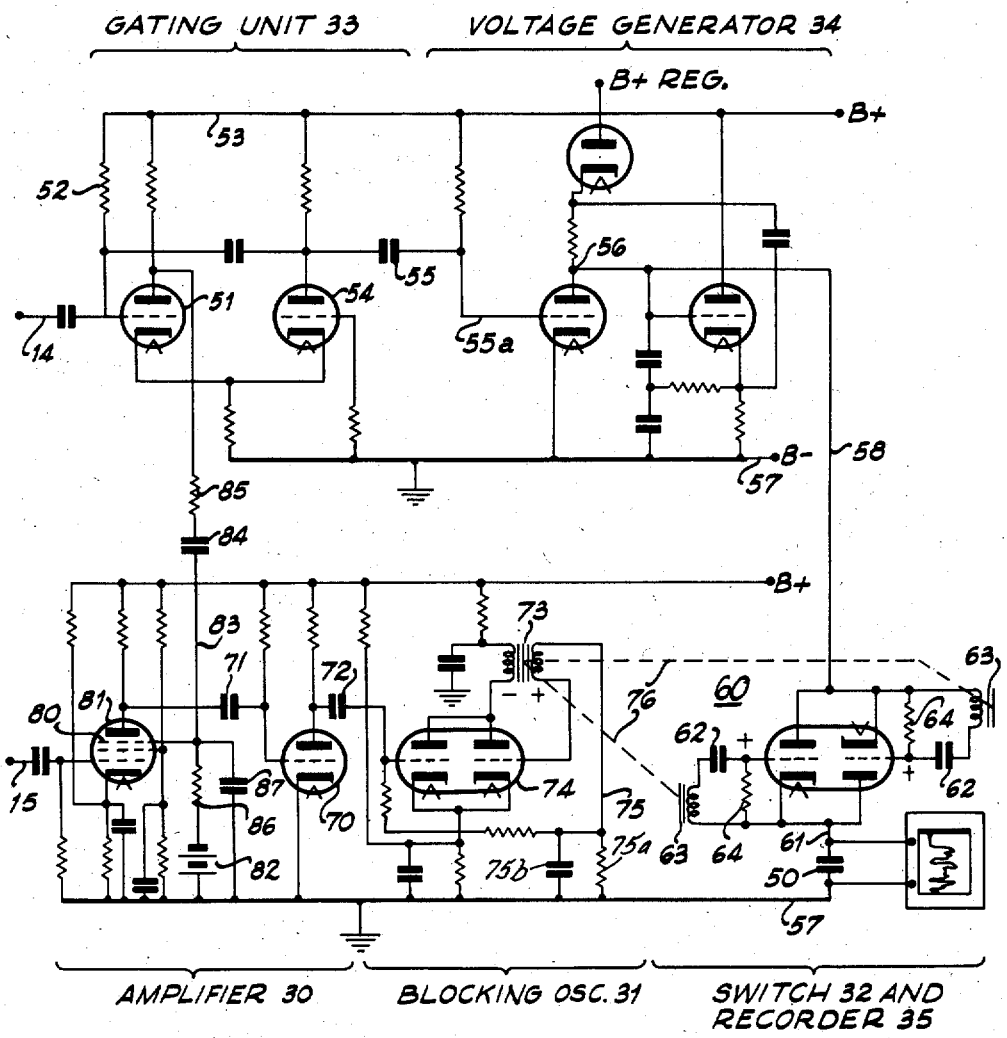
Fig. 3 is a schematic diagram of the system for measuring the interval between two pulses.

For a more detailed description of the system of Fig. 1 and the functions illustrated in Fig. 2, reference should now be had to Fig. 3. In this system, the voltage across the capacitive element on condenser 50 is maintained at a level that is proportional to or at least determined by the interval of time between the application of the transmitted pulse to the circuit over conductor 14 and the arrival of the pulse at the amplifier 30 by way of conductor 15. The voltage for charging the condenser 50 is generated by the unit 34 in response to the output of the gating unit 33.

The gating unit 33 is commonly termed a single shot or monostable multivibrator. The tube 51 of gating unit 33 is normally conductive, its grid being connected by way of resistor 52 to a source of positive potential such as represented by the B+ bus 53. Upon receipt of the pulse 40 of Fig. 2, the grid of tube 51 is driven negative to reduce the anode-cathode current which lowers the cathode voltage and initiates current flow through the second tube 54. The output voltage from the unit 33 coupled to the voltage generator 34 by way of condenser 55 is of the form illustrated at 41, Fig. 2.

The circuit 33 of Fig. 3 illustrates in one form systems well known and understood by those skilled in the art for production of gating pulses. For a general treatment of the construction and operation of such systems, reference may be had to Waveforms, vol. 19, of the M. I. T. Radiation Laboratory Series, McGraw-Hill, 1949, at Section 5.5, page 166.

Similarly, the voltage generator 34 is representative of generators for producing a voltage which varies from a predetermined initial value shown as zero in Fig. 2 following an initiating pulse. In the form illustrated, the circuit is known in the art as a bootstrap linear sweep with a compensating network.

The system together with its controlling multivibrator is of the type illustrated in the above M. I. T. reference, Waveforms, at page 277, Fig. 7.23. The voltage between point 56 and B— ground terminal 57 *is developed across the capacitors connected between point 56 and ground, and that voltage* varies linearly following the application of the gating pulse 41 to the grid 55a. The linearly rising voltage at point 56 is applied by way of conductor 58 and a bi-laterally conductive but normally open vacuum tube switch 60 to condenser 50 *connected across the voltage applying circuit of the measuring instrument 35.*

The switch or circuit-completing means 60 in the form illustrated is a double triode clamp in which the plate of a first triode and the cathode of a second triode are directly connected together and are connected to the conductor 58 which leads to the output point 56 of the voltage generator 34. The remaining cathode and plate are connected directly together and are in turn connected by way of conductor 61 and the condenser 50 to the ground bus 57. If, for each cycle of generation of the saw-tooth voltage 42, the switch 60 is momentarily closed at the same time relative to the initiation of the generation of the saw-tooth voltage (time 46 of Fig. 2), a charge of constant magnitude will be maintained on condenser 50 proportional to the magnitude of the voltage between the point 56 and the ground pulse 57 at the instant of closure. Momentary closure, for the purpose of the present description shall be taken to mean that switch 60 remains closed for a period very short compared to the period of generation of the monotonically varying voltage. As illustrated in Fig. 2, the period of the pulse 45 is very small compared to the period of the saw-toothed voltage 42.

In order to render the double triode clamp or switch 60 conductive at the desired instants, the grid of each of the triodes is connected by way of a condenser 62 and a winding of a pulse transformer 63 to its cathode. A resistor 64 is connected directly between each grid and its cathode. The charge accumulating on condenser 62 maintains the triodes in the non-conducting state by maintaining the grids negative with respect to their respective cathodes. Application of a pulse to the pulse transformer secondary windings 63 drives both of the grids sufficiently positive to permit flow of current either from conductor 58 to conductor 61 or in the reverse direction depending upon the sign of the algebraic sum of the voltage across condenser 50 plus the voltage between point 56 and ground 57. Thus, with the transmitted pulse 40 of Fig. 2 repeatedly generated by transmitter 10, the wave form 41 of Fig. 2 is repeatedly produced to cause corresponding cycles of variation in the voltage between points 56 and 57. When the pulse 45 of Fig. 2 actuates the switch 60 the voltage across the condenser 50 is automatically adjusted and maintained proportional to the time required for transit of an elastic pulse between the crystal 28 and the receiver 11 of Fig. 1.

The control of the switch 60 by the pulse 44 from receiver 11 is accomplished through amplifier 30 and a blocking oscillator forming the unit 31. The pulse 44 is applied to a pentode amplifier 30. The pulse 44 is amplified and applied to a buffer stage 70 of the amplifier 30 by way of a condenser 71. The output of the triode stage 70 is then applied to a blocking oscillator 31 by way of condenser 72.

The oscillator circuit 31 in the form illustrated is a device which produces, in response to an input pulse, a single output voltage oscillation or pulse. In the form illustrated, application of the output signal from the stage 70 to the first grid of a blocking oscillator 31 produces a single cycle of current variation in the pulse transformer 73 connected in the plate circuit of the double triode 74. The pulse transformer 73 has four windings, two of which are used in the oscillator circuit 31 and the remaining two windings 63 control the switch 60. As illustrated, one of said two windings is connected at one terminal to one grid of tube 74 and at the other terminal to conductor 75. A parallel RC circuit, including resistor 75a and condenser 75b, is connected between conductor 75 and ground bus 57. The parallel RC circuit comprises timing means which control the recovery period of the blocking oscillator and preferably has a time constant that the blocking oscillator may be actuated to close the switch 60 but once in each cycle of operation of gating unit 33. Thus this circuit prevents more than a single momentary closure of switch 60 by any one of the received impulses from receiver 11. In this figure, the dotted lines 76 diagrammatically represent a magnetic coupling to the primary of the transformer 73 so that flux generated in a common core of the transformer 73 by current flowing in one winding thereof produces similar voltage pulses in each of the other windings. The polarity of the pulses applied to the grids of switch 60 are made the same as the grid polarity of oscillator tube 74 and opposite to that of the plate polarity of oscillator tube 74. The voltage developed in the grid circuits of the switching tube 60, i. e., in the circuits including condensers 62 and resistors 64, is a restraining force on the switch 60 which maintains it non-conductive or in a normally closed circuit condition. The restraining force or voltage is maintained at a predetermined level depending on the time constants of the grid circuits of switch 60. Pulses from the blocking oscillator 31 applied to the foregoing grid circuits in opposition to the restraining force or voltage momentarily renders the switch 60 conductive. In the foregoing manner, the switch 60 is closed momentarily to permit current flow to or from condenser 50 in response to the received pulse. The voltage across the condenser 50 remains constant so long as the travel time of a pulse between transmitter and receiver of Fig. 1 is constant. The voltage across the condenser 50 is coupled to the recorder 53 by way of a high impedance input circuit such as a cathode follower stage so that variations in velocity as represented by variations in the voltage across the condenser 50 may be recorded.

In the amplifier 30, the suppressor grid 80 of the pentode 81 is biased negatively by battery 82. The negative bias maintains the pentode 81 normally cut off. To permit pentode 81 to conduct, the suppressor grid is coupled by way of conductor 83, condenser 84 and resistor 85 to the plate of the input triode 51 of the gating unit 33. The voltage at the plate of triode 51 varies oppositely to the plate of the triode 54. Thus, coincident with the generation of the pulse 40, there is produced a positive gating voltage at the plate of triode 51. The positive gating voltage which is ordinarily a square wave is modified by the combination of the condenser 84, resistor 85 and the combination of resistor 86 and condenser 87 so that it has the wave form 43 illustrated in Fig. 2. Thus, variation in the gain of pentode 81 eliminates cross feed between the transmitting and receiving circuits. With cross feed between conductors 14 and 15 as they extend side by side throughout the length of the cable eliminated, the receiving channel which controls the operation of switch 60 is responsive only to signals generated by the receiver and accurate and reliable circuit operation is assured.

From the foregoing description it will be recognized that the circuit of Fig. 3 is comprised of a means for generating a voltage which varies from a first value following the transmitted pulse, the variation though preferably linear may be any type that varies monotonically (without change of sign of the slope). The source of monotonically changing voltage is connected in a series circuit with the switch 60 and the condenser 50. The amplifier 30 and the blocking oscillator 31 form a system for actuating the switch 60 upon arrival of the elastic impulse at the receiver 11 so that the condenser 50 will be charged to a voltage equal to the magnitude of the monotonically changing voltage at the instant of arrival of the pulse at the receiver 11.

Figures 4, 6:
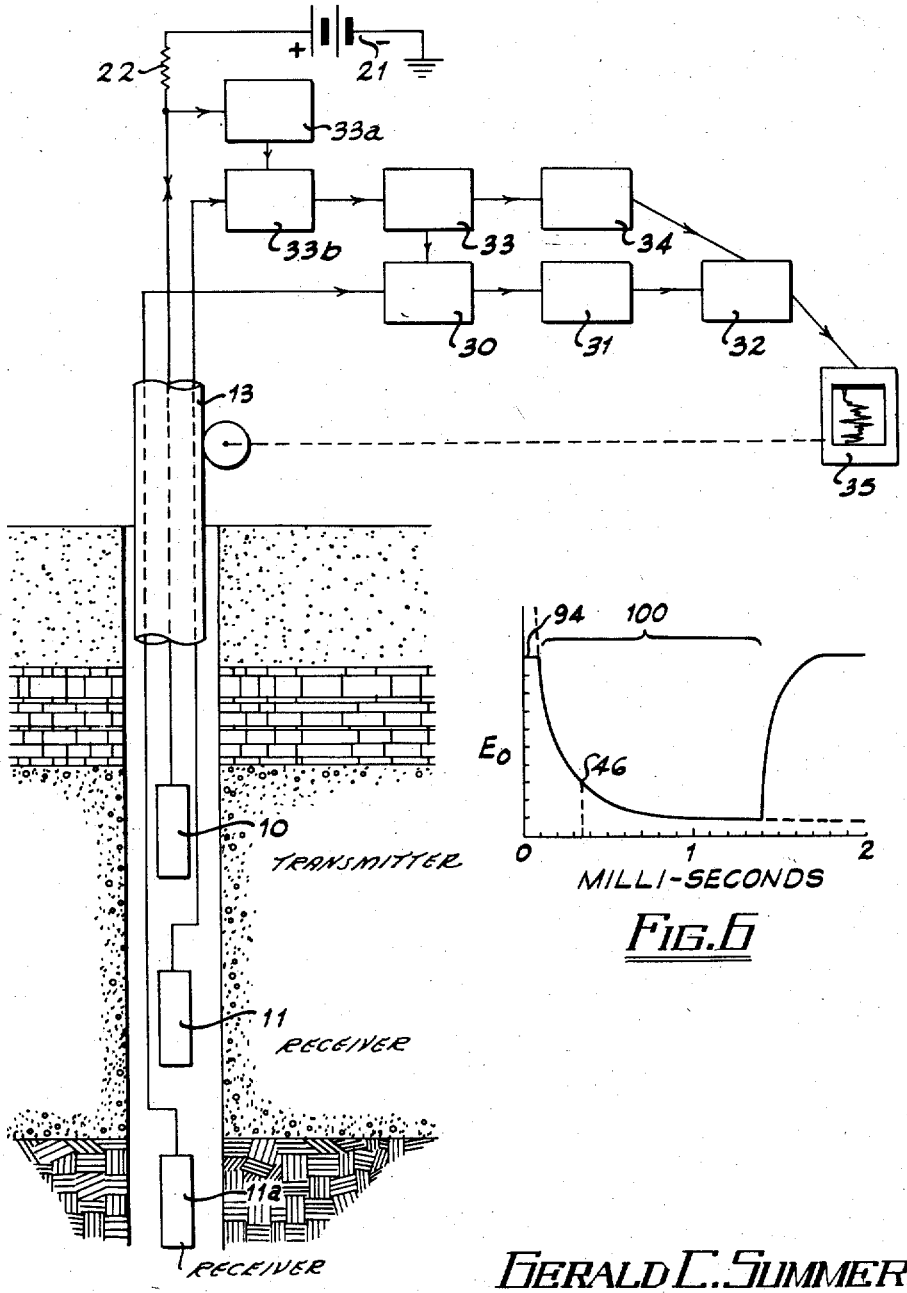
Fig. 4 is a modification of the system of Fig. 1.
Fig. 6 is a graph illustrating operation of the system of Fig. 5.

In Figs. 1–3, the interval between the transmitted pulse and received pulse controls the *electrical quantity or* charge on condenser 50 and thus the recorder 35. In Fig. 4 the interval between the arrival of the transmitted pulse at the receiver 11 and a second receiver 11a is utilized to control the recorder 35. In this system the *generation of each acoustic* [transmitted] pulse controls the gating unit 33a. The gating unit 33a controls an amplifier 33b. Thus, the gain of the amplifier 33b rises following transmission of the acoustic pulse in order to pass the pulse received by the receiver 11. The latter pulse transmitted to the gating unit 33 controls the voltage generator 34 connected to the switch 32. The pulse received by the receiver 11a is then transmitted by way of amplifier 30 and the unit 31 to control the switch 32. This system is basically the same in operation as Fig. 1. The gating unit 33a and the third amplifier 33b are added together with a second receiver so that the recorder 35 will be controlled by two receivers rather than by a transmitter and a single receiver. In either Fig. 1 or Fig. 4 the charge on the condenser 50 is maintained at a level dependent upon the travel time of an impulse between two units spaced in fixed relation one from the other in a bore hole. If the pulse from the transmitter 10 is repeated, for example, at 100 cycles per second, the switch 32 will be closed 100 times per second to permit flow of current to or from the condenser, depending upon whether the travel time of a particular pulse is longer or shorter than that of the preceding pulse.

It will be appreciated that the battery source 21 may be located down-hole in the housing of the transmitter. If such is the case, the cable 13 of Fig. 4 may correspond with the two-conductor cable 13 of Fig. 1. The two conductors provide circuits from the receivers 11 and 11a. Since there is no signal in the cable corresponding with the pulse from transmitter 10, cross feed therefrom is nonexistent and the units 33a and 33b are unnecessary.

Figure 5:
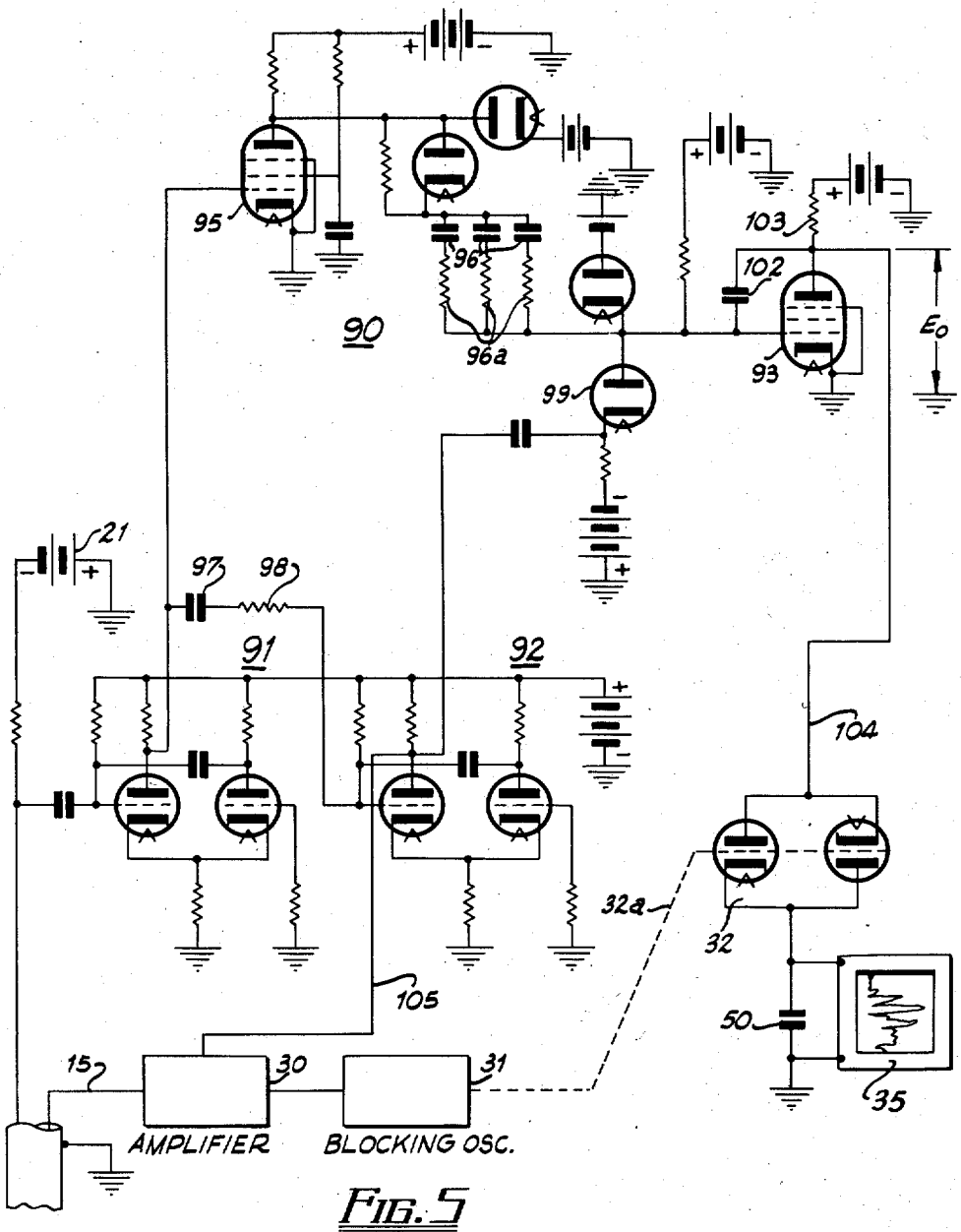
Fig. 5 is a further modification of the invention.

In accordance with the modification of the invention illustrated in Fig. 5, the voltage is inversely proportional to time and is therefore directly proportional to velocity. This is accomplished by producing a monotonically changing voltage having the wave form of a rectangular hyperbola decreasing in magnitude as a function of time. The voltage generator 90 of this circuit is of the type described in the M. I. T. text, Waveforms, beginning at page 302. Basically, the circuit may be the same as that illustrated at page 404, Fig. 8.20, modifications being made as necessary to provide proper time constants in the circuits suitable for sound velocity measurements, as is readily apparent to persons skilled in the art.

The circuit 90 is controlled by two monostable multivibrators 91 and 92. The multivibrators 91 and 92 provide the gating pulses that are required for the desired operation of the circuit 90. Since the principle of operation of the circuit 90 is well understood by those skilled in the art, it will not be described in detail. Briefly, however, the voltage $E_0$ between anode and cathode of the tube 93 is made to vary substantially as illustrated in Fig. 6. During the interval 94 of Fig. 6, the tube 95 is conducting to remove a charge stored on the condensers 96. Tube 95 is rendered conductive by a gating pulse from the multivibrator 91 upon application thereto of an electrical voltage pulse generated coincident with transmission of the acoustic pulse down-hole. The gating pulse from multivibrator 91 has a duration equal to the time interval 94 of Fig. 6. The trailing edge of the gating pulse from the multivibrator 91 is differentiated by condenser 97 and resistor 98 and the resulting pulse is applied to the multivibrator 92 which generates and applies a relatively long gating pulse to the diode 99. The gating pulse from multivibrator 92 has a length represented in Fig. 6 by the reference character 100. During interval 100, the tube 95 is nonconducting, the diode 99 is nonconducting and the charge that was removed from condensers 96 is replaced by way of diode 101 and consequently a charge is placed on condenser 102. The manner of variation of the charge on condenser 102 controls the plate cathode voltage of the tube 93. Charge flows onto condenser 102 not only through condenser 96 but also through resistor 103. By proper selection of condensers 96 together with their associated resistors 96a, the voltage $E_0$ of Fig. 6 during the interval 100 may be made to follow a rectangular hyperbolic function. The voltage $E_0$ in the interval 100 is the counterpart of the voltage 42 of Fig. 2. In response to a received pulse applied to the amplifier 30, this voltage is momentarily applied to condenser 50 through the double triode clamp at the instant 46 which corresponds with a pulse arrival at the acoustic receiver. As the point 46 varies in its position on the curve in the interval 100, the voltage on condenser 50 is adjusted to follow such variations and the trace drawn by the recorder 35 in response to the condenser voltage is directly proportional to the velocity of the formations encountered.

In this system the pulse transmitted from the receiver by way of conductor 15 passes through amplifier 30 and blocking oscillator 31 to control the double triode clamp 32. Details of the clamp circuit have been omitted but the control of the grids thereof is represented by the dotted line 32a and the operation is the same as was explained in connection with Fig. 3.

In Fig. 5, the amplifier 30 may be nonconductive until the positive gating pulse is generated by the multivibrator 92. This positive gating pulse may then be applied by way of conductor 105 to raise the gain of the amplifier 30 for passage therethrough of the received pulse from the down-hole transducer.

Empirical methods may be utilized to fit the curve of Fig. 6 to a rectangular hyperbola described by the equation $$E_0=\frac{K}{t}$$

in which $E_0$ is the output voltage from tube 93; K is a constant and is equal to the voltage $E_0$ in the interval 94; and t is time. For example, spaced pulses may be applied to conductors 14 and 15, respectively, at different known separations. Measurements may then be made of the voltage across condenser 50. Such measurements plotted against pulse separation will fall on a rectangular hyperbola when condensers 96 and resistors 96a are of proper magnitude.

The time interval 94 necessarily is shorter than the interval between transmission and reception of the acoustic pulses in the highest velocity formation encountered. If the transmitter and receiver are spaced five feet apart and the highest velocity formation encountered has a velocity of 20,000 feet per second, the interval between transmitted and received pulse will be .25 millisecond. Accordingly, the interval 94 of Fig. 6 may be made slightly less than the above time interval. As illustrated, a time of .2 millisecond corresponding with the length of the pulse generated by the multivibrator 91 is utilized. The interval 94 plus the interval 100 is greater than the interval between the transmitted pulse and received pulse in the lowest velocity formation encountered. Since the velocity in water is in the order of 4,000 feet per second and formation velocities are generally higher, a minimum time interval would be 1.2 milliseconds.

While particular embodiments of the invention have been illustrated and described, it will be understood that further modifications will now suggest themselves to those skilled in the art. It is therefore intended to cover such modifications of the invention as fall within the scope of the appended claims.

What is claimed is:

[1. A system for logging the acoustic velocity of formations adjacent a well bore which comprises an acoustic pulse transmitter movably positioned in said well bore, a voltage generator for producing a voltage that changes monotonically as a function of time following application thereto of a control pulse, a circuit for applying said control pulse from said transmitter to said voltage generator coincident with transmission of said acoustic pulse to initiate production of said monotonically changing voltage, a condenser, a normally open switch for connecting said condenser to said voltage generator, an acoustic transducer positioned in said well bore for generating a voltage pulse in response to the arrival of said acoustic pulse and means including a circuit interconnecting said acoustic transducer and said switch for momentarily closing said switch in response to said voltage pulse to charge said condenser to a voltage equal to the instantaneous magnitude of said monotonically changing voltage occurring at the instant of arrival of said acoustic pulse at said transducer.]

[2. A system for logging the acoustic velocity of formations adjacent a well bore which comprises an acoustic pulse transmitter movably positioned in said well bore, a voltage generator for producing a voltage that increases linearly as a function of time following application thereto of a control pulse, a circuit for applying a control pulse from said transmitter to said voltage generator coincident with transmission of said acoustic pulse to initiate production of said monotonically changing voltage, a condenser, a normally open switch for connecting said condenser to said voltage generator, an acoustic transducer positioned in said well bore for generating a voltage pulse in response to the arrival of said acoustic pulse and means including a circuit interconnecting said transducer and said switch for momentarily closing said switch in response to said voltage pulse to charge said condenser to a voltage equal to the instantaneous magnitude of said linearly increasing voltage at the instant of arrival of said acoustic pulse at said transducer.].

[3. A system for measuring the acoustic velocity of formations adjacent a well bore which comprises an acoustic pulse transmitter movably positioned in said well bore, a voltage generator for producing a reference voltage that decreases substantially as a rectangular hyperbolic function of time following application thereto of a control pulse, means for applying a control pulse to said voltage generator in response to transmission of said acoustic pulse to initiate production of said voltage, a condenser and a normally open switch connected to the output of said voltage generator, an acoustic receiver positioned in said well bore and spaced from said transmitter for generating a voltage pulse upon receipt of said acoustic pulse and circuit means interconnecting said receiver and said switch for momentarily closing said switch in response to said voltage pulse to charge said condenser to a voltage equal to the magnitude of said reference voltage having said rectangular hyperbolic function at the instant of receipt of said acoustic pulse.]

[4. A system for measuring the acoustic velocity of formations adjacent a well bore which comprises an acoustic pulse transmitter movably positioned in said well bore, a voltage generator for producing a voltage that decreases substantially as a rectangular hyperbolic function of time following application thereto of a control pulse, a circuit interconnecting said transmitter and said voltage generator for applying a control pulse to said voltage generator at the instant of transmission of said acoustic pulse to initiate production of said voltage, a condenser and a normally open switch connected to the output of said voltage generator, an acoustic receiver positioned in said well bore and spaced from said transmitter for generating a voltage pulse upon receipt of said acoustic pulse and circuit means interconnecting said receiver and said switch for momentarily closing said switch in response to said voltage pulse to charge said condenser to a voltage equal to the magnitude of said rectangular hyperbolic function at the instant of receipt of said acoustic pulse.]

5. A system for measuring the interval required for travel of an acoustic impulse between two transducers positioned in a predetermined spaced apart relation in a well bore which comprises means *having output terminals* effective in response to the first of said transducers for generating *at said output terminals* a voltage that varies monotonically from a predetermined initial value following actuation of said first transducer, a capacitive element, a pair of vacuum tubes each of which has a control grid, a cathode and an anode, circuit means connecting a first of said output terminals through said capacitive element to the anode of a first of said tubes and the cathode of the second of said tubes, a circuit connecting the second of said terminals to the other cathode and anode of said tubes, means in the grid-cathode circuits of said tubes for normally biasing said tubes to anode current cut-off, and means effective in response to the arrival of said acoustic impulse at the second of said transducers for momentarily raising the potential of said grids for conduction through said tubes to maintain said capacitive element charged to a voltage equal to the magnitude of said monotonically varying voltage at the instant of arrival of said acoustic impulse at the second of said transducers.

6. A system for determining the time interval between repeatedly occurring primary electrical pulses and secondary pulses, one of which occurs in each interval between primary pulses comprising a generator *having output terminals* for producing at *said* output terminals thereof a voltage that varies monotonically from a predetermined initial value following each primary pulse, a capacitive element, a pair of vacuum tubes each of which has a cathode, a control grid and an anode, a circuit for connecting a first of said output terminals through said capacitive element to the anode of a first of said tubes and the cathode of the second of said tubes, a circuit for connecting the other cathode and anode to the second of said output terminals, a blocking oscillator having an output pulse transformer with a plurality of secondary windings, means for connecting one of said windings in the grid-cathode circuit of each of said tubes, means normally biasing said tube to anode current cut-off, and means for actuating said blocking oscillator in response to said secondary pulses to raise the grid-cathode potential of said tubes for flow of current therethrough to or from said capacitive element whereby said capacitive element is charged to a voltage equal to the magnitude of said monotonically varying voltage at the instants of occurrence of said secondary pulses.

7. A system for measuring time intervals comprising a capacitor for acquiring an electrical charge of magnitude representative of a time interval, means for producing at the beginning of each time interval to be measured an initial pulse and at the end of such time interval a final pulse, a generator for generating a voltage which varies from a predetermined initial value to a predetermined final value during a period greater than the maximum length of time intervals to be measured, means responsive to the production of each initial pulse for initiating operation of said generator, means responsive to the production of each final pulse for modifying the electrical charge on said capacitor in proportion to the difference between the voltage across said capacitor and the instantaneous voltage produced by said generator at the instant of generation of said final pulse by momentarily connecting said capacitor to said generator at an instant during the period of generation of said monotonically varying voltage related to the instant of production of said final pulse, and means for measuring the voltage across said capacitor without materially changing its charge.

8. A system of measuring time intervals comprising a capacitor, means for producing at the beginning of each time interval to be measured an initial pulse and at the end of such time interval a final pulse, a generator for generating a voltage which monotonically varies from a predetermined initial value to a predetermined final value during a predetermined period of time, means responsive to the production of each initial pulse for initiating operation of said generator, and means for maintaining on said capacitor a potential difference corresponding with instantaneous values of said monotonically varying voltage occurring at the instant of production of said final pulse comprising a circuit controller for momentarily applying to said capacitor said instantaneous voltage, said initial pulse-producing means including a timing circuit for establishing time spaces between successive initial pulses greater than the periods of generation of said monotonically varying voltage.

[9. A system for measuring the acoustic velocity of formations adjacent a well bore which comprises an acoustic pulse transmitter positioned in said well bore for generating acoustic impulses, means for cyclically generating voltages which from predetermined initial values each occurring coincidentally with generation of one of said impulses varies monotonically to a different value, a capacitive element, a circuit including a normally open circuit-closing means interconnecting said capacitive element and said voltage-generating means, an acoustic transducer positioned in said well bore in spaced relation with said transmitter responsive to arrival of acoustic impulses from said transmitter, and means connected to said transducer and responsive to operation thereof by reception of one of said impulses for actuating said circuit-closing means to close said circuit to charge said condenser to a voltage equal to that of said monotonically changing voltage at the instant of arrival of said one of said acoustic impulses at said transducer.]

[10. A system for measuring the acoustic velocity of formations adjacent a well bore which comprises an acoustic pulse transmitter positioned in said well bore for generating acoustic impulses, means for cyclically generating voltages which from predetermined initial values each occurring coincidentally with generation of one of said impulses varies monotonically to a different value, a capacitive element, normally open circuit-closing means, a circuit including said circuit-closing means interconnecting said capacitive element and said voltage-generating means, an acoustic transducer positioned in said well bore in spaced relation with said transmitter responsive to arrival of acoustic impulses from said transmitter, each said impulse having a substantial length, and means connected to said transducer and responsive to operation thereof by reception of one of said impulses for actuating said circuit-closing means for momentary closure of said circuit to charge said condenser to a voltage equal to that of said monotonically changing voltage at the instant of arrival of said one of said acoustic impulses at said transducer, said last-named means including a control means for preventing more than said momentary closure of said circuit-closing means by any one of said received impulses.]

*11. A system for logging the acoustic velocity of formations adjacent a well bore which comprises means including an acoustic pulse transmitter movably positioned in said well bore for generating and transmitting to said formations an acoustic pulse and for concurrently generating a control pulse, a voltage generator responsive to the application thereto of said control pulse for producing a voltage that changes monotonically as a function of time following application thereto of said control pulse, a circuit for applying said control pulse from said transmitter to said voltage generator coincident with said transmission of said acoustic pulse to initiate production of said monotonically changing voltage, a condenser, a normally open switch for connecting said condenser to said voltage generator for acquirement by said condenser of a charge proportional to an instantaneous magnitude of said monotonically varying voltage, an acoustic transducer movably positioned in said well bore in spaced relation with said transmitter for generating a voltage pulse in response to the arrival of said acoustic pulse, means including a circuit interconnecting said acoustic transducer and said switch for momentarily closing said switch in response to said voltage pulse to change the charge of said condenser upon change in the instantaneous magnitude of said monotonically changing voltage applied thereto at the instant of arrival of said acoustic pulse at said transducer, and means responsive to said charge on said condenser for indicating the acoustic velocity of said formations as said transmitter and said transducer are moved along said well bore.*

*12. A system for logging the acoustic velocity of formations adjacent a well bore which comprises means including an acoustic pulse transmitter movably positioned in said well bore for generating and transmitting to said formations an acoustic pulse and for concurrently generating a control pulse, a voltage generator responsive to the application thereto of said control pulse for producing a voltage that increases linearly as a function of time following application thereto of said control pulse, a circuit for applying a control pulse from said transmitter to said voltage generator coincident with said transmission of said acoustic pulse to initiate production of said monotonically changing voltage, a condenser, a normally open switch for connecting said condenser to said voltage generator for acquirement by said condenser of a charge proportional to an instantaneous magnitude of said monotonically varying voltage, an acoustic transducer movably positioned in said well bore in spaced relation with said transmitter for generating a voltage pulse in response to the arrival of said acoustic pulse, means including a circuit interconnecting said transducer and said switch for momentarily closing said switch in response to said voltage pulse to change the charge of said condenser upon change in the instantaneous magnitude of said linearly increasing voltage applied thereto at the instant of arrival of said acoustic pulse at said transducer, and means responsive to said charge on said condenser for indicating the acoustic velocity of said formations as said transmitter and said transducer are moved along said well bore.*

*13. A system for measuring the acoustic velocity of formations adjacent a well bore which comprises means including an acoustic pulse transmitter movably positioned in said well bore for generating and transmitting to said formations an acoustic pulse and for concurrently generating a control pulse, a voltage generator responsive to the application thereto of said control pulse for producing a reference voltage that decreases substantially as a rectangular hyperbolic function of time following application thereto of said control pulse, means for applying said control pulse to said voltage generator in response to said transmission of said acoustic pulse to initiate production of said voltage, a condenser, a normally open switch connecting said condenser to the output of said voltage generator for acquirement by said condenser of a charge proportional to an instantaneous magnitude of said monotonically varying voltage, an acoustic receiver movably positioned in said well bore and spaced from said transmitter for generating a voltage pulse upon receipt of said acoustic pulse, circuit means interconnecting said receiver and said switch for momentarily closing said switch in response to said voltage pulse to change the charge of said condenser upon change in the magnitude of said reference voltage having said rectangular hyperbolic function applied thereto at the instant of receipt of said acoustic pulse, and means responsive to said charge on said condenser for indicating the acoustic velocity of said formations as said transmitter and said transducer are moved along said well bore.*

*14. A system for measuring the acoustic velocity of formations adjacent a well bore which comprises means including an acoustic pulse transmitter movably positioned in said well bore for generating and transmitting to said formations an acoustic pulse and for concurrently generating a control pulse, a voltage generator responsive to the application thereto of said control pulse for producing a voltage that decreases substantially as a rectangular hyperbolic function of time follwing application thereto of said control pulse, a circuit interconnecting said transmitter and said voltage generator for applying said control pulse to said voltage generator at the instant of transmission of said acoustic pulse to initiate production of said voltage, a condenser, a normally open switch for connecting said condenser to the output of said voltage generator for acquirement by said condenser of a charge proportional to an instantaneous magnitude of said monotonically varying voltage, an acoustic receiver movably positioned in said well bore and spaced from said transmitter for generating a voltage pulse upon receipt of said acoustic pulse, circuit means interconnecting said receiver and said switch for momentarily closing said switch in response to said voltage pulse to change the charge of said condenser upon change in the magnitude of said rectangular hyperbolic function at the instant of receipt of said acoustic pulse at said receiver, and means responsive to said charge on said condenser for indicating the acoustic velocity of said formations as said transmitter and said transducer are moved along said well bore.*

*15. A system for logging the acoustic velocity of formations adjacent a well bore comprising at least two acoustic transducers in fixed predetermined spaced apart relation one to the other, means for moving said spaced transducers along said well bore, means for periodically generating acoustic pulses in said well bore for travel through said formations located between said transducers, a generator for generating an electrical function that changes monotonically as a function of time following application thereto of a control pulse, means including a control circuit for generating and applying said control pulse to said generator coincident with the appearance at a first of said transducers of one of said acoustic*

*pulses to initiate production of said electrical function, an electrical storage means, circuit control means operable to connect said storage means to said generator, means connected to said control means responsive to arrival of said one acoustic pulse at a second of said transducers momentarily actuating said circuit control means for changing the magnitude of the electrical quantity stored by said storage means whenever it differs from a magnitude representative of that of said monotonically varying function at the instant of operation of said circuit control means, and measuring means responsive to the magnitude of the electrical quantity stored by said storage means and to changes in that quantity for indicating the acoustic velocity of the formations between said first and said second of said transducers and for indicating changes in said acoustic velocity as said transducers are moved along formations adjacent said bore hole of differing acoustic velocity.*

*16. The logging system of claim 15 in which each of said acoustic pulses has a substantial length and in which said means connected to said control means includes a circuit means for preventing more than said momentary actuation of said circuit-control means by any one of said impulses applied thereto.*

*17. An acoustic well logging system for measuring the interval required for travel of an acoustic pulse through formations between two acoustic receivers movably positioned in a predetermined spaced apart relation in a well bore which comprises means for periodically generating an acoustic pulse in said well bore, a generator for generating an electrical function that changes monotonically as a function of time following application thereto of a control pulse, means including a circuit for generating and for applying said control pulse to said generator coincident with the appearance of one of said acoustic pulses at the first of said receivers to initiate production of said monotonically changing function, an electrical storage means, circuit control means for connecting said storage means to said generator, means connected to said control means effective in response to the arrival of said one acoustic pulse at the second of said receivers for momentarily actuating said circuit control means for storage in said storage means upon actuation of said circuit control means of an electrical quantity of magnitude corresponding with the instantaneous magnitude of said monotonically changing function at the instant of arrival of said one acoustic pulse at the second of said receivers, and measuring means responsive to the magnitude of the electrical quantity stored by said storage means and to changes in that quantity for indicating the acoustic velocity of the formations between said receivers and for indicating change in said acoustic velocity as said receivers are moved along formations adjacent said bore hole of differing acoustic velocity.*

*18. A system for logging the acoustic velocity of formations adjacent a well bore comprising at least two acoustic transducers in fixed predetermined spaced apart relation one to the other, means for moving said spaced transducers along said well bore, means for periodically generating acoustic pulses in said well bore for travel through formations located between said transducers, a voltage responsive measuring instrument for indicating the acoustic velocity of the formations between a first of said transducers and a second of said transducers and for indicating changes in said acoustic velocity as the transducers are moved along formations adjacent said well bore of differing acoustic velocity, means including a first control circuit for generating a first control pulse in predetermined time relation with the appearance at a first of said transducers of one of said acoustic pulses, means including a second control circuit for generating a second control pulse in response to the appearance at a second of said transducers of said one acoustic pulse, a voltage applying circuit connected to said measuring instrument, circuit controlling means, a generator including storage means operable under the control of said circuit controlling means for generating a voltage that changes monotonically as a function of time following application to said circuit controlling means of a control pulse, means for applying said first control pulse to said circuit controlling means for initiating operation of said generator and for applying said second control pulse to said circuit controlling means for application to said instrument by way of said voltage applying circuit of a voltage from said storage means having the value of the monotonically changing voltage which existed coincidentally with the arrival of said one acoustic pulse at said second of said transducers whereby said instrument indicates said acoustic velocity and said change in acoustic velocity.*

References Cited in the file of this patent or the original patent

UNITED STATES PATENTS

| | | |
|---|---|---|
| 2,120,971 | Bailey | June 21, 1938 |
| 2,191,119 | Schlumberger | Feb. 20, 1940 |
| 2,200,476 | Mounce | May 14, 1940 |
| 2,225,668 | Subkow et al. | Dec. 24, 1940 |
| 2,231,243 | Beers | Feb. 11, 1941 |
| 2,233,992 | Wyckoff | Mar. 4, 1941 |
| 2,238,991 | Cloud | Apr. 22, 1941 |
| 2,492,617 | Boland et al. | Dec. 27, 1949 |
| 2,522,433 | Dahlberg | Sept. 12, 1950 |
| 2,599,586 | Ross | June 10, 1952 |

FOREIGN PATENTS

| | | |
|---|---|---|
| 469,417 | Great Britain | July 26, 1937 |

OTHER REFERENCES

Ser. No. 282,916, Wellenstein (A. P. C.), published May 18, 1943.